(12) United States Patent
Hsu et al.

(10) Patent No.: US 7,482,782 B2
(45) Date of Patent: Jan. 27, 2009

(54) CHARGE CONTROL SYSTEM USING PULSE WIDTH MODULATION

(75) Inventors: Chih-Min Hsu, Hsinchu (TW); Dar-Cherng Su, Hsinchu (TW); Albert Chen, Hsinchu (TW); Cheng-Chieh Ku, Hsinchu (TW); Jui-Liang Wang, Hsinchu (TW); Charles Huang, Hsinchu (TW)

(73) Assignee: Integrated Systems Solution Corp., Hsinchu (TW)

( * ) Notice: Subject to any disclaimer, the term of this patent is extended or adjusted under 35 U.S.C. 154(b) by 55 days.

(21) Appl. No.: 11/515,728

(22) Filed: Sep. 6, 2006

(65) Prior Publication Data

US 2008/0054846 A1  Mar. 6, 2008

(51) Int. Cl.
*H01M 10/46* (2006.01)
(52) U.S. Cl. ...................................... 320/107
(58) Field of Classification Search ................. 320/107, 320/128, 112, 141
See application file for complete search history.

(56) References Cited

U.S. PATENT DOCUMENTS

| | | | | |
|---|---|---|---|---|
| 5,717,307 | A | * | 2/1998 | Barkat et al. ................ 320/106 |
| 5,864,220 | A | * | 1/1999 | Reipur et al. ................ 320/134 |
| 2002/0000788 | A1 | * | 1/2002 | Ostergaard et al. .......... 320/128 |
| 2004/0095263 | A1 | * | 5/2004 | Thomas ........................ 341/53 |

* cited by examiner

*Primary Examiner*—Edward Tso
(74) *Attorney, Agent, or Firm*—Rosenberg, Klein & Lee

(57) ABSTRACT

A charge control system for lithium battery using pulse width modulation is provided, and it detects the existing voltage of the charging lithium battery by a voltage detector and passes this voltage value to a microprocessor preset in the hand-held apparatus. Thus, the microprocessor can decide the applicable charge stage and confirm the status of the charging battery depending on the different Voltage values in real time. Next, the microprocessor controls a control unit by a pulse width modulation signal to modulate the power-source, which comes from an adaptor, as a constant current or a constant voltage to charge the battery. Accordingly, the charge process is completed by repeating the voltage detection and the duty cycle modulation of the control unit.

17 Claims, 3 Drawing Sheets

CHARGE CONTROL SYSTEM USING PULSE WIDTH MODULATION

BACKGROUND OF THE INVENTION

1. Field of the Invention

The present invention relates to a charge control system for a lithium battery, and more especially, to the charging system controlled by a microprocessor.

2. Background of the Related Art

Due to the popularity of the wireless communication and the technological trend, a hand-held apparatus with the features of lightness, handiness, convenience and multi-function is popular and widely used. In order to satisfy the practical and convenient requirements, the market of the batteries for the hand-held apparatus is increasing day by day. To satisfy the requirement of the user who needs the long standby time, the charging battery with large capacity is a very important essential accessory. Further, in order to fully employ the efficiency of the charging battery, using a charging-completed battery is beneficial for the economic consideration. However, if the user doesn't know whether the battery is charged completely or not and if the charging process doesn't stop automatically, it is easy to reduce the battery lifetime, damage the battery, and be dangerous. Therefore, how to automatically check the charging status and the existing voltage of the battery is one of urgent issues for the hand-held apparatus.

A conventional charging way of the hand-held apparatus is to add a charging chip into the hand-held apparatus to control the charging status and handle the requirement of the charging battery. However, due to the demand of the miniaturization of the hand-held apparatus and the increment of the electric component configured on the printed circuit board for raising the functions of the hand-held apparatus, the applicable layout and the space for the applying circuit of the hand-held apparatus are demanding day by day. Therefore, in a prerequisite of automatically checking the charging status and the existing voltage of the battery and not affecting the charging efficiency, the size reduction for the charging system is an urgent and important work.

SUMMARY OF THE INVENTION

One object of this invention is to provide a charge control system for the lithium battery using pulse width modulation to integrate a control program of charging circuits into a microprocessor preset in a hand-held apparatus, and it can save the cost of externally-connecting a charging chip.

One object of this invention is to provide a charge control system for the lithium battery using pulse width modulation to shorten the development time of the hand-held apparatus and substantially reduce the design cost.

One object of this invention is to provide a charge control system for the lithium battery using pulse width modulation, wherein a microprocessor uses a pulse width modulation signal to modulate the duty cycle of a control unit, and depending on the different battery capacities of the lithium batteries, the power provided by a charging unit is modulated as the applicable current or voltage to charge the lithium battery.

Accordingly, one embodiment of the present invention provides a charge control system for the lithium battery using pulse width modulation including: a microprocessor; a control unit electrically connected to the microprocessor and receiving a control signal which comes from the microprocessor, wherein the control signal is a pulse width modulation signal to control a duty cycle of the control unit; a charging unit electrically connected to the control unit and depending on the duty cycle of the control unit, wherein the power provided by the charging unit is modulated as the applicable current or voltage to charge the lithium battery; and a voltage detector including an input terminal to receive an analog voltage value and an output terminal to electrically connect to the microprocessor to detect the existing voltage of the lithium battery and send the voltage to the microprocessor, wherein the microprocessor is used to judge the applicable charging way of the lithium battery and the status of the charging battery in real time during the charging process.

DETAILED DESCRIPTION OF THE INVENTION

One better embodiment thereinafter is provided to explain the charge control system for a lithium battery using pulse width modulation of the present invention.

Figure 1:
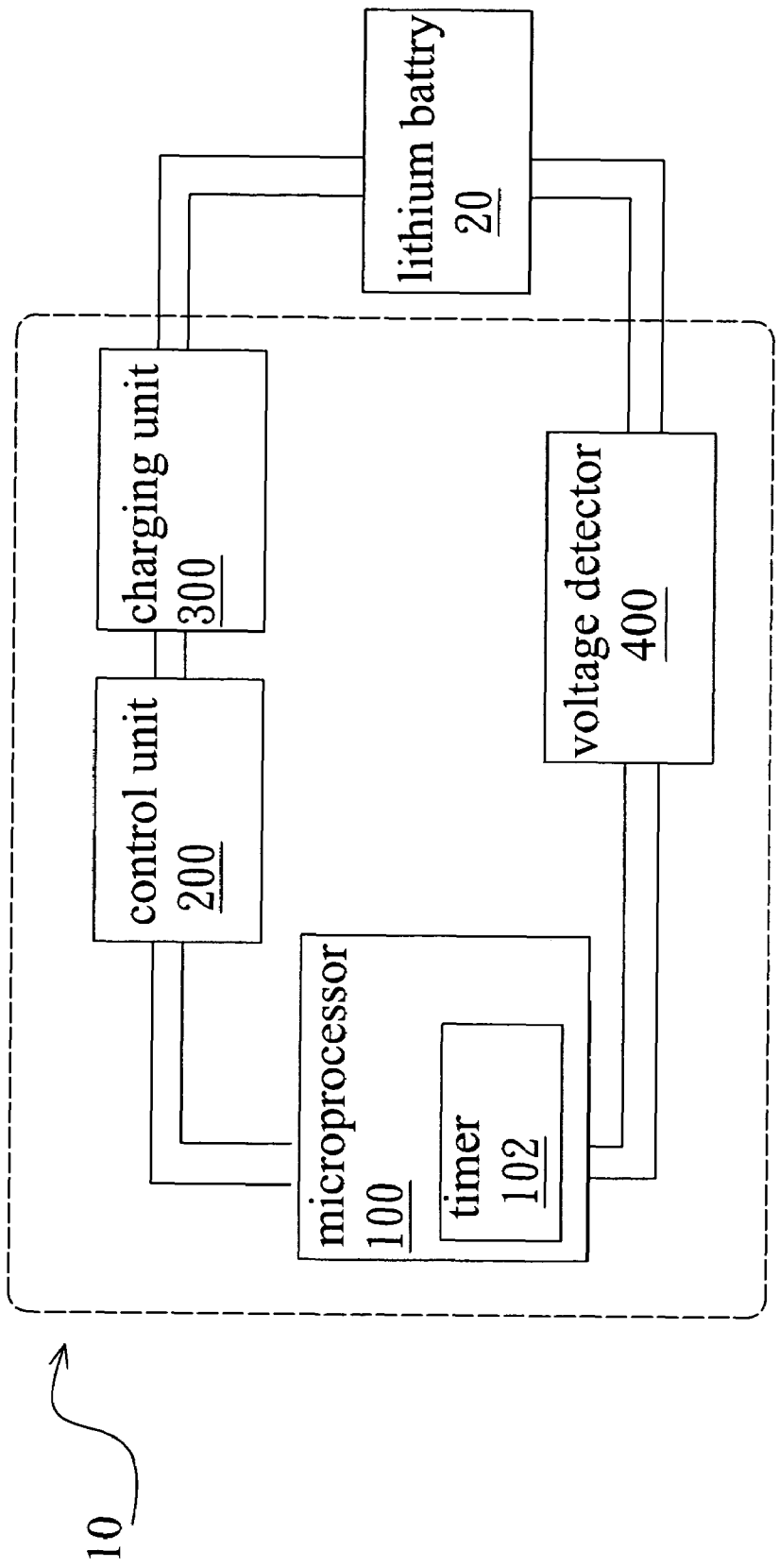
FIG. 1 is a schematically block diagram illustrating the charge control system for the lithium battery using pulse width modulation in accordance with an embodiment of the present invention.

FIG. 1 is a block diagram illustrating the charge control system for the lithium battery using pulse width modulation in accordance with an embodiment of the present invention. Referring to FIG. 1, a charge control system for the lithium battery using pulse width modulation 10 includes: a microprocessor 100 to process and control a hand-held apparatus; a voltage detector 400, wherein one terminal of it is electrically connected to a lithium battery 20 and the other terminal is electrically connected to the microprocessor 100 to detect the current charging status and the existing voltage of the lithium battery 20; a control unit 200 electrically connected to the microprocessor 100; a charging unit 300, wherein one terminal of it is electrically connected to the control unit 200 and the other terminal is electrically connected to the lithium battery 20.

In the present embodiment, before charging the lithium battery 20, the voltage detector 400 detects the existing voltage ($V_{BAT}$) of the lithium battery 20 in advance and uses an analog-to digital converter (ADC) set in the voltage detector 400 to convert the analog voltage value of $V_{BAT}$ to a digital voltage value, and then the voltage detector 400 sends the digital voltage value to the microprocessor 100 by the electric connection to judge the value. If the microprocessor 100 decides that the lithium battery 20 needs to be charged, the microprocessor 100 sends a control signal to the control unit 200, wherein the control unit 200 is a switch-control circuit (such as at least one transistor) or a switch to control the operation of the charging unit 300. When the control unit 200 receives the control signal from the microprocessor 100 to enable the charging unit 300 charge the lithium battery 20, the control unit 200 turns on to drive and enable the charging unit 300 to charge up the lithium battery 20, wherein the control signal is a pulse width modulation signal which comes from a firmware (not shown in FIG. 1) set in the microprocessor 100 to modulate the duty cycle of the control unit 200. Depending on the duty cycle of the control unit 200, the power provided by the charging unit 300 is modulated as the applicable current or voltage for charging the lithium battery 20. Further, the charging unit 300 includes a power input port, such as a plug or a universal serial bus (USB), to obtain the charging power. During the charging process, the voltage detector 400 detects the status and the $V_{BAT}$ of the lithium battery 20 simultaneously and continuously sends the $V_{BAT}$ to the microprocessor 100 to judge whether to complete the charging process or not. When the voltage detector 400 detects that the $V_{BAT}$ value is equal to or more than 4.2 volts, the microprocessor 100 sends a control signal to order the control unit 200 to control the charging unit 300 to stop charging the lithium battery 20. Understandably, the charge control system for the lithium battery using pulse width modulation 10 completes the charging process of the lithium battery 20 by detecting the $V_{BAT}$ continuously and enabling the charging unit 300. Further, the microprocessor 100 includes a timer 102 to protect the lithium battery 20. If the lithium battery 20 is not charged to the expected power in a predetermined time, it is indicated that there is something wrong in the charging process to fail the charging, and then the charging process is forced to stop.

Figure 2:
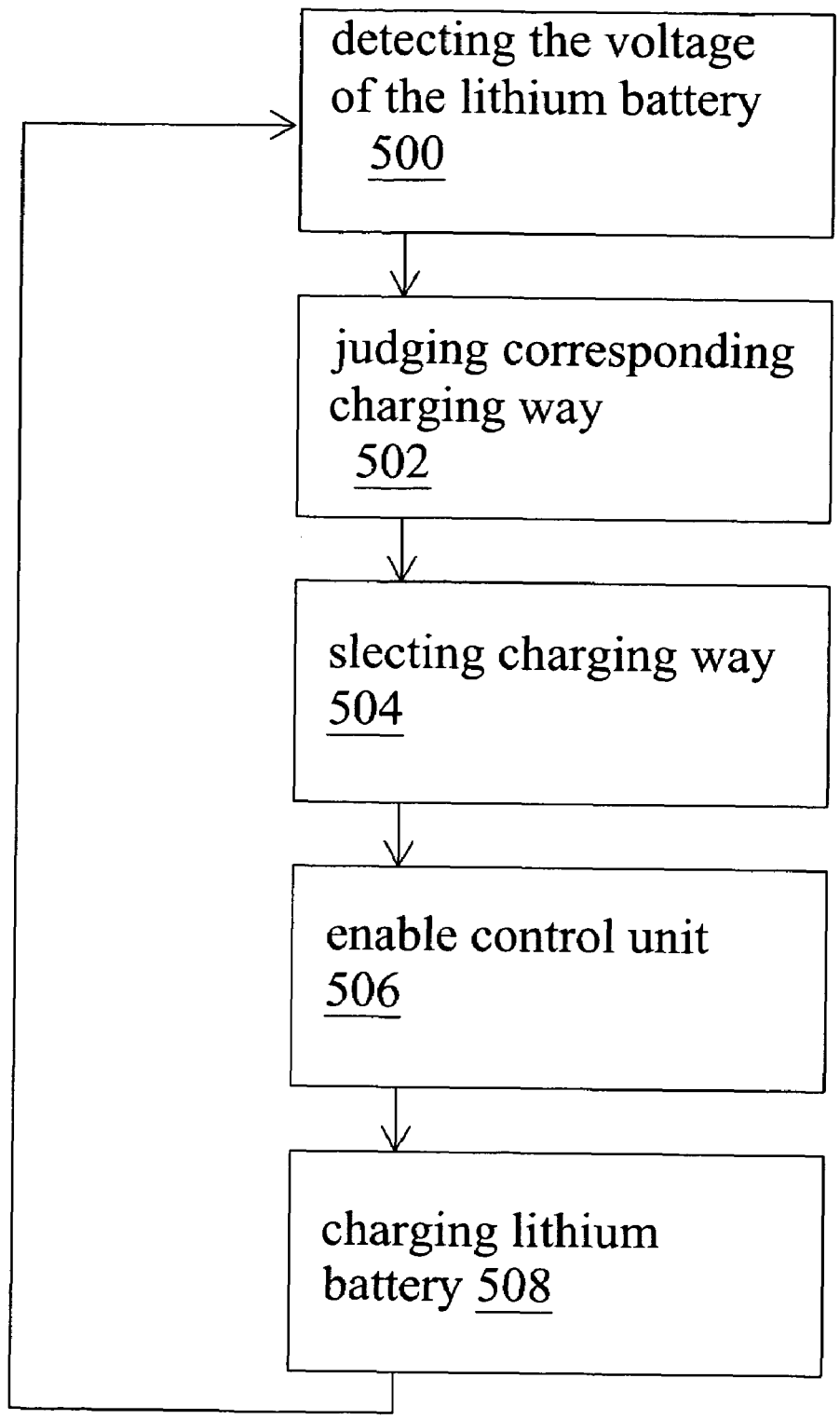
FIG. 2 is a flow diagram illustrating the charging flow of the lithium battery in accordance with one embodiment of the present invention.

Referring to FIG. 2, it is a flow diagram illustrating the charging flow of the lithium battery in accordance with one embodiment of the present invention. In the present embodiment, before charging the lithium battery, the voltage detector detects the existing voltage ($V_{BAT}$) (step 500) of the lithium battery to judge the corresponding charging way (step 502). Three charging stages are provided, they are the pre-charge stage, the constant-current-charging stage and the current-voltage-charging stage. If the detected $V_{BAT}$ value is less than 3 volts, the charging process enters into the pre-charge stage to use the current of 10 mA to pre-charge the lithium battery. Then, if the $V_{BAT}$ value of the pre-charged lithium battery is reached more than 3 volts in the predetermined pre-charging protection time (15 minutes), the pre-charge stage is completed, and if the $V_{BAT}$ value of the charged lithium battery is not reached more than 3 volts in 15 minutes during the pre-charge process, it is indicated that there is something wrong in the charging process to fail the charging.

If the detected $V_{BAT}$ value is between 3 volts and 4.1 volts, the charging process enters into the constant-current-charging stage (step 504) to use constant current of 0.5 C (1 C is equal to the expected charging capacity of lithium battery per hour, for example, if the expected charging capacity of lithium battery is 500 mAh, the charging current of 1 C equals to 500 mA) to charge the lithium battery with constant current, wherein a function of pulse width modulation from a firmware set in the microprocessor is used to modulate the duty cycle of the control unit (step 506), and depending on the duty cycle of the control unit, the power provided by the charging unit is modulated as the applicable constant current for charging the lithium battery. Then, if the $V_{BAT}$ value of the charged lithium battery is reached more than 4.1 volts in the predetermined charging protection time with constant current (90 minutes), the constant-current-charging stage is completed, and if the $V_{BAT}$ value of the charged lithium battery is not reached more than 4.1 volts in 90 minutes during the charging process with the constant current, it is indicated that there is something wrong in the charging process to fail the charging.

If the detected $V_{BAT}$ value is more than 4.1 volts, the charging process enters into the current-voltage-charging stage (step 504) to use constant voltage of 4.2 volts to charge the lithium battery with constant voltage, wherein the function of pulse width modulation from the firmware set in the microprocessor is used to modulate the duty cycle of the control unit (step 506), and depending on the duty cycle of the control unit, the power provided by the charging unit is modulated as the applicable constant voltage for charging the lithium battery and then to proceed the charging with constant voltage (step 508). At this time, the charging current comes down slowly and then if the charging current comes down to 0.1 C and the $V_{BAT}$ value of the charged lithium battery is reached to 4.2 volts in the predetermined charging protection time with constant voltage (90 minutes) (step 508), the constant-voltage-charging stage is completed, and if the $V_{BAT}$ value of the charged lithium battery is not reached more than 4.2 volts in 90 minutes during the charging process with the constant voltage, it is indicated that there is something wrong in the charging process to fail the charging.

Wherein, the charging protection times of the three charging stages (pre-charge stage, constant-current-charging stage and current-voltage-charging stage) are predetermined by the firmware in the microprocessor and the charging protection times can be adjusted according to the characteristic of the different lithium batteries and the timer is designed to stop charging to protect the lithium battery when a charging error is happened during the charging process.

To sum up, in the present embodiment, during the charging process of the lithium battery, the voltage detector detects the voltage of the lithium battery continuously to judge and select the corresponding charging way for the lithium battery (step 502, 504), and then the microprocessor enables the control unit depending on the function of pulse width modulation (step 506) to modulate the power provided by the charging unit as the applicable constant current or constant voltage to charge the lithium battery (step 508). Accordingly, the charging process is completed by repeating the steps 500, 502, 504, 506 and 508 continuously.

Figure 3:
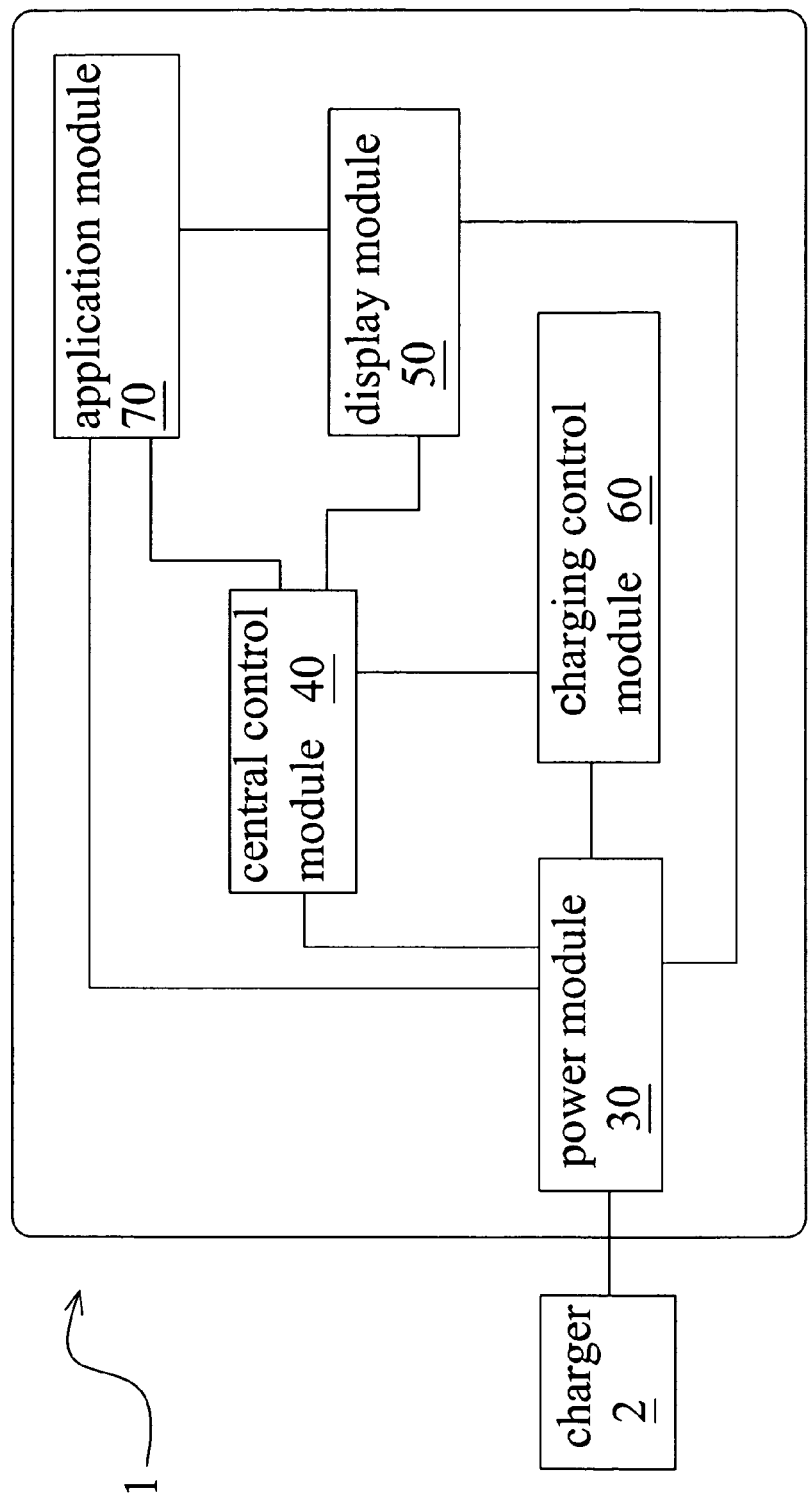
FIG. 3 is a schematically block diagram illustrating the structure of the hand-held apparatus.

FIG. 3 is a block diagram illustrating the structure of the hand-held apparatus. Referring to FIG. 3, the hand-held apparatus 1 includes: a shell (not shown in FIG. 3); a central control module 40 including at least one microprocessor set in the shell, wherein the microprocessor is applied to control all the applying procedures and operations of the hand-held apparatus 1; an application module 70 set in the shell and connected electrically to the central control module 40; a power module 30, such as a lithium battery, set in the shell to provide the applicable power for the hand-held apparatus 1; a display module 50 set in the shell and electrically connected to the central control module 40; a charging control module 60 set in the shell and connected electrically to the central control module 40, wherein the charging control module 60 includes a voltage detecting unit and a control unit, one terminal of the voltage detecting unit is electrically connected to the power module 30 to detect the existing voltage of the power module 30, the other terminal of the voltage detecting unit is connected electrically to the microprocessor to send the voltage of the power module 30 to the microprocessor for judgment, and one terminal of the control unit is electrically connected to the microprocessor to receive the pulse width modulation signal from the microprocessor.

When charging the power module 30 of the hand-held apparatus 1, the voltage detecting unit of the charging control module 60 detects the existing voltage of the power module 30 and an analog-to-digital converter included in the voltage detecting unit is applied to convert the existing voltage from an analog voltage value to a digital voltage value. Then the voltage detecting unit sends the digital voltage value to the microprocessor to perform the judgment of the voltage signal.

If the microprocessor judges that the power module 30 necessary to be charged, the microprocessor sends a control signal to the control unit of the charging control module 60, wherein the control unit is a switch-control circuit (such as at least one transistor) or a switch to control the operation of a charger 2. When the control unit receives the control signal from the microprocessor to enable the charger 2 to charge the power module 30, the control unit turns on to drive the charger 2, wherein the control signal is a pulse width modulation signal which comes from the microprocessor to modulate the duty cycle of the control unit. Depending on the duty cycle of the control unit, the power provided by the charger 2 is modulated as the applicable current or voltage for power module 30. Further, the charger 2 includes a power input port, such as a plug or an universal serial bus (USB), to obtain the charging power. During the charging process, the voltage detecting unit detects the status and the voltage of the power module 30 simultaneously and continuously sends the voltage signal to the microprocessor to judge whether to complete the charge process or not.

When the voltage detecting unit detects that the voltage value is equal to or more than 4.2 volts, the microprocessor of the central control module 40 sends a control signal to order the control unit to control the charger 2 stop charging the power module 30. Understandably, the charging control module 60 and the central control module 40 complete the charging process of the power module 30 by detecting the voltage continuously and enabling the charger in the duty cycle. Further, the microprocessor of the central control module 40 includes a timer to protect the power module 30. If the power module 30 is not charged to the expected power in a predetermined time, it is indicated that there is something wrong in the charging process to fail the charging, and then the charging process is forced to stop.

To sum up, the charge control system for the lithium battery using pulse width modulation is provided in the embodiment of the present invention. The voltage detector is applied to detect the current voltage of the lithium battery and send the voltage to the microprocessor preset in the hand-held apparatus. The microprocessor is used to judge the applicable charging way of the lithium battery and the status of the charging battery in real time during the charging process, then the pulse width modulation signal is used to modulate the duty cycle of the control unit and the power provided by the charging unit is modulated as the applicable constant current for charging the lithium battery depending on the duty cycle of the control unit. Accordingly, the charging process is completed by repeating the voltage detection and the duty cycle modulation of the control unit.

Although the present invention has been explained in relation to its preferred embodiment, it is to be understood that other modifications and variation can be made without departing the spirit and scope of the invention as hereafter claimed.

What is claimed is:

1. A charge control system for a lithium battery using pulse width modulation, applied to a hand-held apparatus, comprising:
   a microprocessor processing and controlling said hand-held apparatus;
   a control unit electrically connected to said microprocessor and receiving a control signal which comes from said microprocessor;
   a charging unit electrically connected to said control unit; and a voltage detector including an input terminal to receive an analog voltage value and an output terminal to electrically connect to said microprocessor.

2. The charge control system for the lithium battery using pulse width modulation according to claim 1, wherein said control unit is a switch.

3. The charge control system for the lithium battery using pulse width modulation according to claim 1, wherein said charging unit includes a power input port which is a universal serial bus.

4. The charge control system for the lithium battery using pulse width modulation according to claim 1, wherein said voltage detector further includes an analog-to-digital converter to convert said analog voltage value to a digital voltage value, and said voltage detector sends said digital voltage value to said microprocessor.

5. The charge control system for the lithium battery using pulse width modulation according to claim 1, wherein said control signal is a pulse width modulation signal to control a duty cycle of said control unit.

6. The charge control system for the lithium battery using pulse width modulation according to claim 5, wherein said pulse width modulation signal is produced by a firmware set in said microprocessor.

7. The charge control system for the lithium battery using pulse width modulation according to claim 1, wherein said microprocessor further includes a timer.

8. The charge control system for the lithium battery using pulse width modulation according to claim 1, wherein said control unit is a switch-control circuit.

9. The charge control system for the lithium battery using pulse width modulation according to claim 8, wherein said switch-control circuit is at least one transistor.

10. The charge control system for the lithium battery using pulse width modulation according to claim 1, wherein said charging unit includes a power input port which is a plug.

11. The charge control system for the lithium battery using pulse width modulation according to claim 1, wherein said charging unit electrically connects a lithium battery and charges said lithium battery.

12. The charge control system for the lithium battery using pulse width modulation according to claim 1, wherein said microprocessor and said voltage detector are integrated into an integrated circuit.

13. Hand-held apparatus, comprising:
    a shell;
    a central control module including at least a microprocessor set in said shell;
    an application module set in said shell and electrically connected to said central control module;
    a power module set in said shell to provide power;
    a display module set in said shell and electrically connected to said central control module; and
    a charging control module set in said shell and electrically connected to said central control module, wherein said charging control module includes:
    a voltage detecting unit, one terminal of said voltage detecting unit electrically connected to said power module and the other terminal of said voltage detecting unit electrically connected to said microprocessor; and
    a control unit, one terminal of said control unit electrically connected to said microprocessor to receive a pulse width modulation signal from said microprocessor.

14. The hand-held apparatus according to claim 13, wherein another terminal of said control unit of said charging control module is electrically connected to a charger and the duty cycle of said charger is controlled by said pulse width modulation signal.

15. The hand-held apparatus according to claim 14, wherein another terminal of said charger is electrically connected to said power module to get the power source of said hand-held apparatus.

16. The hand-held apparatus according to claim 13, wherein said voltage detecting unit includes an analog-to-digital converter to convert an analog voltage value of said power module to a digital voltage value, and said voltage detecting unit sends said digital voltage value to said microprocessor.

17. The hand-held apparatus according to claim 13, wherein said microprocessor further includes a timer.

* * * * *